INVENTORS
ALFRED L. LEVINE
PETER P. M. YEE
BY Herbert L. Davis
ATTORNEY

ELECTROSTATIC READER HEAD

Filed Nov. 18, 1964 4 Sheets-Sheet 2

INVENTORS
ALFRED L. LEVINE
PETER P. M. YEE
BY Herbert L. Davis
ATTORNEY

INVENTORS
ALFRED L. LEVINE
PETER P. M. YEE
BY Herbert L. Davis
ATTORNEY

INVENTORS
ALFRED L. LEVINE
PETER P. M. YEE
BY [signature]
ATTORNEY

United States Patent Office 3,479,491
Patented Nov. 18, 1969

3,479,491

ELECTROSTATIC READER HEAD

Alfred L. Levine, Waldwick, N.J., and Peter P. M. Yee, Woodside, N.Y., assignors to The Bendix Corporation, Teterboro, N.J., a corporation of Delaware Filed Nov. 18, 1964, Ser. No. 412,102
Int. Cl. G06k *7/00;* H04l *15/12*
U.S. Cl. 235—61.11 4 Claims

ABSTRACT OF THE DISCLOSURE

A reader head for use with a voltage sensing device and including a base having a plurality of capacitor elements arranged in cooperative relation with electrically conductive metallic channels on a longitudinally moving tape. Means are provided for guiding the tape to move over the base so that the capacitance of the capacitor elements is varied whereby a voltage pattern is provided which is sensed by the sensing device.

This invention relates to an electrostatic sensing device and more particularly to a device for sensing voltage variations due to a change in dielectric characteristics in an electrostatic arrangement.

When dealing with instrument systems providing a visual display such as a moving tape indicating operating criteria, or a tape or marker reading against a reference line, it is frequently necessary and desirable to transmit the information so displayed in a digital form.

Heretofore, the basic problem in evolving such data has been in the initial sensing of such digital information. Mechanical means have proved inadequate due to the limitations in accuracy caused by friction or slippage. Moreover, packaging limitations, typical in aircraft and space applications, often preclude such space consuming mechanical linkages.

The present invention provides an improved reader head effective through an electrostatic phenomenon, for sensing digitally encoded voltage variations. In a copending U.S. application Ser. No. 406,680, filed Oct. 27, 1964 by A. Levine and assigned to The Bendix Corporation, the assignee of the present invention, there is described and claimed broadly a reader head and tape cooperatively arranged in relation to each other for sensing digitally encoded voltage variations. The present invention relates in particular to improvements in the construction of the reader head described in the aforementioned U.S. application Ser No. 406,680.

An object of the present invention is to provide a novel means of sensing changes in the dielectric characteristics of an electrostatic arrangement.

Another object of the present invention is to provide a novel means of sensing voltage variations due to a change in dielectric characteristics of an electrostatic arrangement.

Another object of the present invention is to provide a novel means of evolving encoded signals which, when coupled with suitable transducing devices, will provide encoded digital data.

Another object of the present invention is to provide a novel reader head including a base of an epoxy resin or other suitable electrical insulating material coated with a wear-resistant polyamide material such as nylon or a self-lubricating wear-resistant polyfluorocarbon material such as Teflon, and in which base there may be embedded a plurality of minute capacitive elements arranged in cooperative relation with electrically conductive metallic channels carried by a tape which passes over the base so as to vary the capacitance of the capacitive elements upon longitudinal adjustment of the tape relative to the base, the tape being carried by antifriction rollers having jackets formed of an epoxy resin or other suitable electrical insulating material coated with a wear-resistant polyamide material such as nylon or a self-lubricating wear-resistant polyfluorocarbon material such as Teflon.

Another object of the present invention is to provide in combination with such a reader head a compact assemblage of impedance matching means corresponding to the capacitive elements embedded in the reader head, and effecting a matching of the high impedance signal received from the capacitors in the reader head to the low impedance required by a transducing device.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
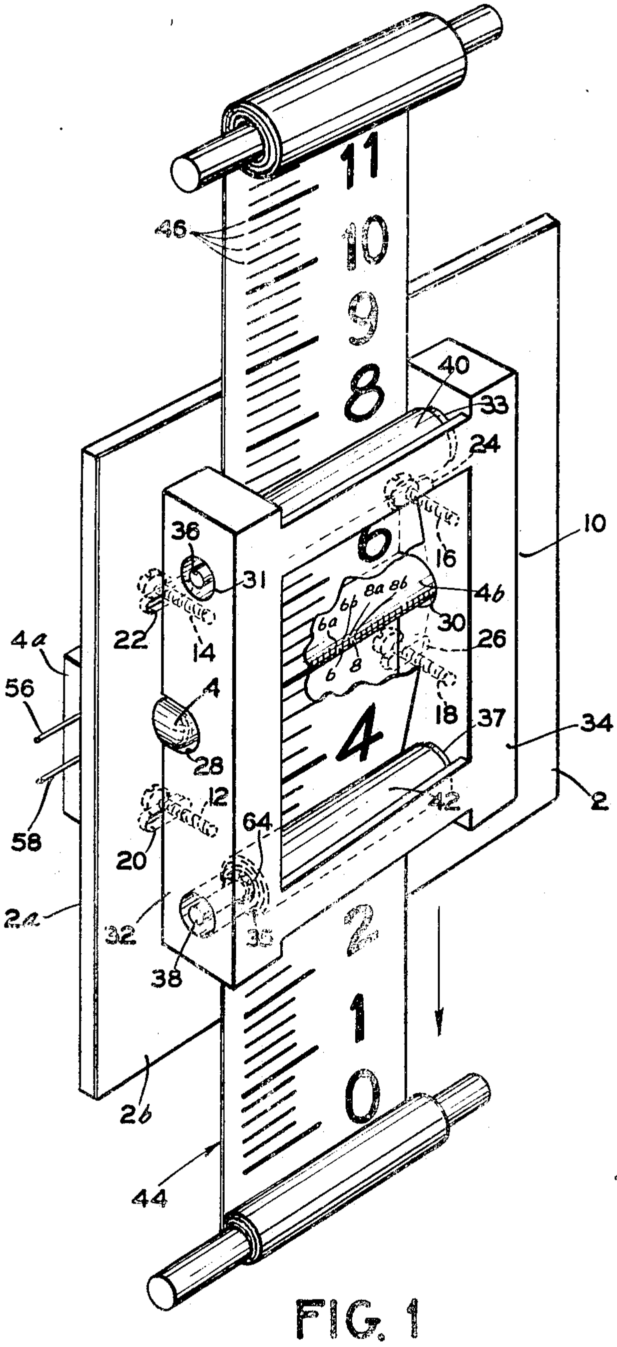
FIGURE 1 is a perspective diagrammatic view showing the elements of the novel electrostatic reader head and the interrelation between said elements.

Referring now to FIGURE 1, there is shown a mounting frame designated by a numeral 2 having a surface 2*a* and a surface 2*b*, the purpose of the mounting frame 2 being to contain the other elements embodied in the present invention thus providing a modular, unitized arrangement of said elements.

Figures 3, 4, 4A:
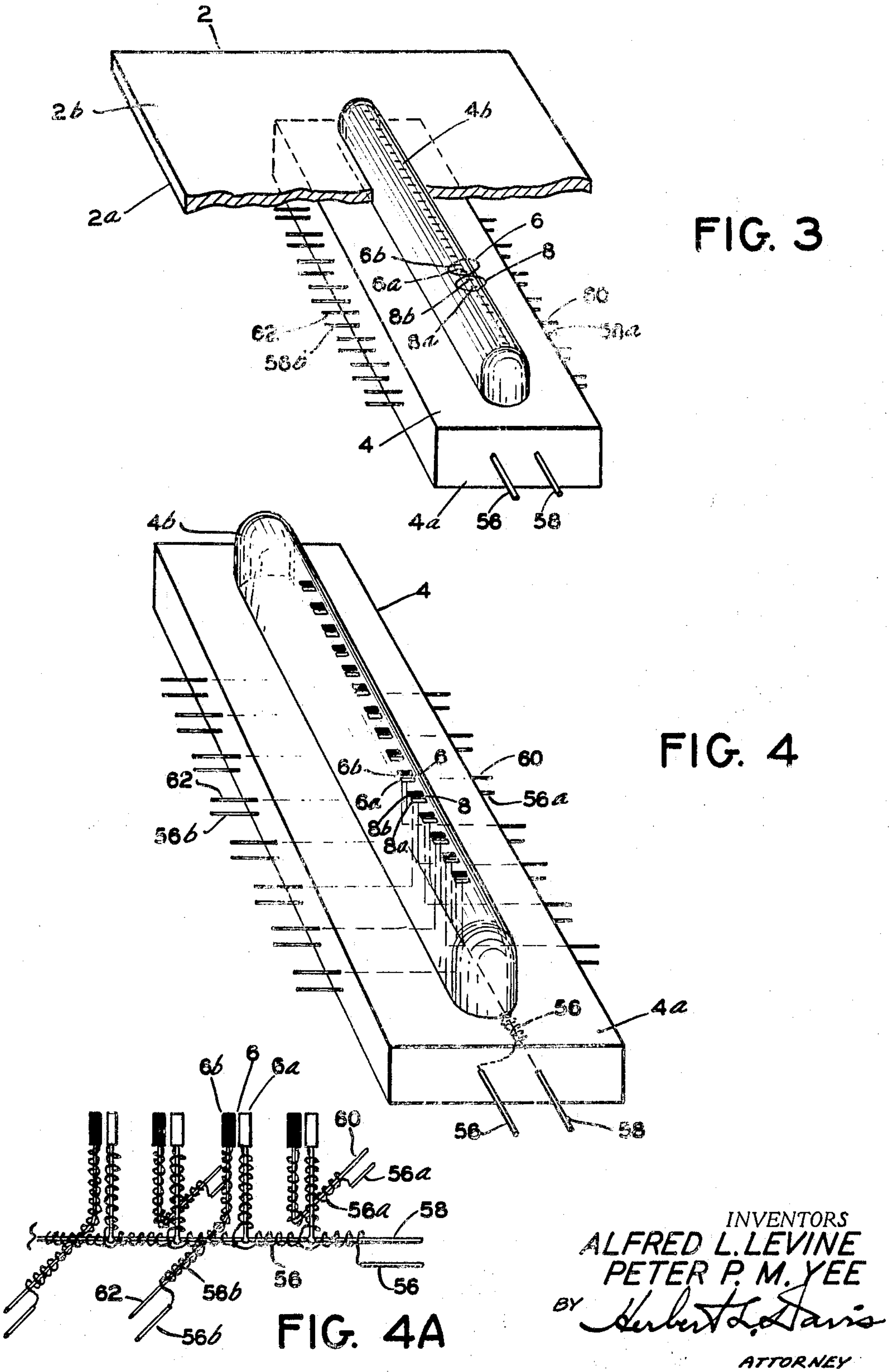
FIGURE 3 is a perspective view of the reader head base showing the arrangement of the various elements thereof.
FIGURE 4 is a diagrammatic perspective view showing the mechanical interconnections of the elements embodied in the reader head base.
FIGURE 4A is a diagrammatic view showing in detail the interconnections of FIGURE 4.

Secured to the mounting frame 2 is a reader head base 4 having a surface 4*a* and a surface 4*b*, which may be molded of an epoxy resin or other suitable electrical insulating material and coated with a wear-resistant film of a solid polyamide material such as nylon or a suitable wear-resistant self-lubricating polyfluorocarbon material such as Teflon. The surface 4*b* of the reader head base 4 contains a plurality of capacitors embedded therein with a capacitor 6 and a capacitor 8 shown in the FIGURE 1 for purposes of illustration, and the surface 4*a* of the reader head base 4 contains suitable electrical interconnections between the plurality of capacitors, including a power input conductor 58 and a ground potential shield conductor 56, pertinent to the novel means of providing digital data as described herein. The reader head base 4 is arranged in relation to the mounting frame 2 so that the surface 4*b* of the reader head base 4 extends beyond the surface 2*b* of the mounting frame 2 and the surface 4*a* of the reader head base 4 extends beyond the surface 2*a* of the mounting frame 2. The actual construction and interconnections relating to the reader head base 4 is shown in FIGURES 3, 4, and 4A.

Figure 1A:
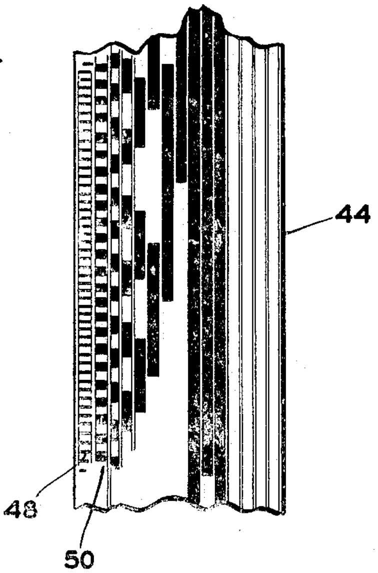
FIGURE 1A is a fragmentary view of the tape means embodied in the invention showing the side of the tape with the coded channels thereof.

A guide block 10 is secured to the surface *2b* of the mounting frame 2 by four screws 12, 14, 16, and 18, as shown in FIGURE 1. The mounting frame 2 contains four elongated slots 20, 22, 24, and 26 to provide for lateral adjustment of the guide block 10 as it is positioned over the surface *4b* of the reader head base 4. The guide block 10 contains a groove 28 and a groove 30 on the rear surface of a leg 32 and a leg 34 of the guide block 10. The purpose of the grooves 28 and 30 is to provide suitable clearances between the guide block 10 and the surface *4b* of the reader head base 4. A roller 36 and a roller 38 are journaled between the legs 32 and 34 of the guide block 10. One roller 36 is journaled near the top of guide block 10 at a point 31 and a point 33 and the other roller 38 is journaled near the bottom of the guide block 10 at a point 35 and a point 37. The rollers 36 and 38 have jackets 40 and 42 of an epoxy resin or other suitable electrical insulating material coated with a wear-resistant film of a solid polyamide material such as nylon or a wear-resistant self-lubricating polyfluorocarbon material such as Teflon. A ball bearing 64 is included at each of the four journal points 31, 33, 35, and 37. The rollers 36 and 38 are arranged so as to apply tension to and hold in position a tape 44. The tape 44 includes a functional scale 46 on one side with a plurality of metallic channels, shown here for purposes of illustration as a channel 48 and a channel 50, coded to the functional scale on the other side, as shown in FIGURE 1A. The tape 44 is longitudinally movable, and as such movement takes place, the channels 48 and 50 on the tape 44 will pass over the capacitors 6 and 8 embedded in the surface *4b* of the reader head base 4.

As the tape 44 passes under the rollers 36 and 38 having jackets 40 and 42 and journaled in the legs 32 and 34 of the guide block 10, and over the plurality of capacitors embedded in surface *4b* of the reader head base 4 shown for purposes of illustration as capacitors 6 and 8, the tape 44 will move in a direction parallel to the legs 32 and 34 of the guide block 10. The lateral movement of the tape 44 will be restrained by the legs 32 and 34 of the guide block 10, and the tension on the tape 44 required for appropriate contact of the tape 44 with the capacitors 6 and 8 on the surface *4b* of the reader head base 4 will be provided by the rollers 36 and 38 with the jackets 40 and 42 being in rolling contact with the tape 44.

Depending on the length and frequency of the channels 48 and 50, voltage changes will result due to a change in capacitance caused by the channels 48 and 50 coming in and out of contact with the capacitor plates, such as the plates *6a* and *6b* of the capacitor 6 and the plates *8a* and *8b* of the capacitor 8 embedded in the surface *4b* of the reader head base 4. The plurality of channels such as the channels 48 and 50 included on the tape 44 corresponds to the plurality of capacitors such as the capacitors 6 and 8 included in the surface *4b* of the reader head base 4.

With the aforenoted arrangement, therefore, a plurality of voltage signal patterns will result with each of said voltage signal patterns being connected to an electronic encoding means as described in the aforementioned U.S. application Ser. No. 406,680.

Figure 2:
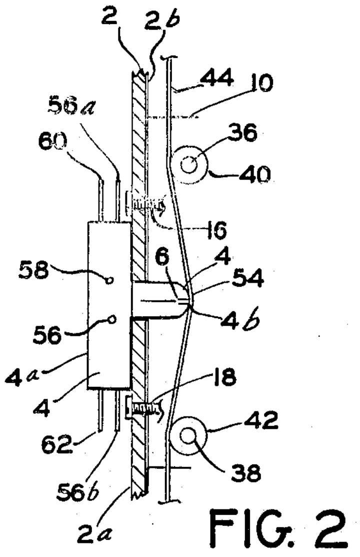
FIGURE 2 is a side sectional view showing the various components of the novel electrostatic reader head.

Referring now to FIGURE 2, a reader head base 4 is secured to a mounting frame 2 with a surface *4b* of the reader head base 4, containing a plurality of capacitors of which a capacitor 6 is shown in FIGURE 2, extending beyond the surface *2b* of the mounting frame 2. A guide block 10, secured to the surface *2b* of the mounting frame 2 by four screws of which the screws 16 and 18 are shown in the figure, has a roller 36 and a roller 38 journaled therein so that when a tape 44 is positioned underneath the rollers 36 and 38, and in contact with the jackets 40 and 42 of the rollers 36 and 38, a slight contact occurs between the tape 44 and the surface *4b* of the reader head base 4 at a point 54. The surface of the tape 44 containing the plurality of channels and the reader head base 4 containing the plurality of capacitors are coated with a wear-resistant film of a solid polyamide material such as nylon or a wear-resistant self-lubricating polyfluorocarbon material such as Teflon so as to prevent actual contact between the channels on the tape 44 and the capacitors in the reader head base 4. Secured in and extending externally to the surface *4a* of the reader head base 4 which extends beyond surface *2a* of the mounting frame 2, is a ground potential shield conductor 56, a power input conductor 58, a plurality of output shield conductors shown here for purposes of illustration as conductor 56a and a conductor 56b and a plurality of signal output conductors, shown in FIGURE 2 for purposes of illustration, as a conductor 60 and a conductor 62.

Referring now to FIGURE 3, a reader head base 4 may be secured to a mounting frame 2 by inserting the mounting frame 2 into a suitable two-piece mold and molding thereto the reader head base 4. The lower half of the mold may have a cavity to form a surface *4a* of the reader head base 4 which extends beyond a surface *2a* of the mounting frame 2 and contains the interconnections between the plurality of capacitors shown in FIGURE 3 as the capacitors 6 and 8. The upper half of said mold may have a cavity to form a surface *4b* of the reader head base 4 which extends beyond a surface *2b* of the mounting frame 2 and contains the input and output plates of the plurality of capacitors shown in FIGURE 3 as plates *6a, 6b, 8a,* and *8b* of the capacitors 6 and 8. The reader head base 4 may be of an epoxy resin or other suitable electrical insulating material.

The mechanical assembly of the plurality of capacitors shown in FIGURE 3 as the capacitors 6 and 8, is shown in FIGURE 4 and FIGURE 4A, with this assembly being placed in the cavity in the lower half of the mold which forms the surface *4a* of the reader head base 4. Suitable fixturing may be provided so that the input conductors 56 and 58 and a plurality of output conductors shown as the conductors 56a and 60 and the conductors 56b and 62 will be embedded in and extend externally to the resulting molded module. The plurality of capacitor plates shown in FIGURE 3 as the plates *6a* and *6b* and the plates *8a* and *8b* are positioned in the cavity in the upper half of the mold so that they will be included in the surface *4b* of the reader head base 4 formed by the upper half of said mold.

Upon completion of the molding process, an integral module consisting of the mounting frame 2 and the reader head base 4 is evolved. The surface *4b* of the reader head 4 is machined to ensure that the capacitor plates *6a* and *6b* and *8a* and *8b* are free of any molding material. The reader head base 4 is coated with a wear-resistant film of a polyamide material such as nylon or a wear-resistant self-lubricating polyfluorocarbon material such as Teflon.

Referring now to FIGURE 4 and FIGURE 4A, the mechanical connections of the plurality of capacitors shown in FIGURES 1, 2, and 3 are shown in FIGURE 4 and FIGURE 4A.

Each of a plurality of capacitors, shown in the FIGURE 4 for purposes of illustration as the capacitors 6 and 8, has an input plate shown as a plate *6a* and a plate *8a* and an output plate shown as a plate *6b* and a plate *8b* embedded in the surface *4b* of the reader head base 4. The input to the plurality of capacitors is coupled through a common conductor 58 connected to the plurality of input plates, such as the plates *6a* and *8a*, of each of the capacitors such as the capacitors 6 and 8. As shown in FIGURE 4A, the common input conductor 58 is shielded by a shield 56, the shield 56 being of conventional braided metallic construction. The input conductor 58 and the shield 56 are embedded in the surface *4a* of the reader head base 4 and extend externally therefrom as shown in FIGURE 4.

Each of the plurality of capacitors such as the capacitors 6 and 8 is coupled through an output plate, shown in FIGURE 4 as a plate 6*b* and a plate 8*b*, to an output conductor such as a conductor 60 and a conductor 62. The output signals so evolved are shielded by a shield of conventional braided metallic construction such as the shield 56*a* shielding conductor 60 and the shield 56*b* shielding the conductor 62, as shown in FIGURE 4A. The plurality of output conductors such as the conductors 60 and 62 and the plurality of shields such as the shields 56*a* and 56*b* are embedded in the surface 4*a* of the reader head base 4 and extend externally therefrom, as shown in FIGURE 4.

The plurality of output conductors, such as the conductors 60 and 62, shielded by the shields 56*a* and 56*b*, are connected to a plurality of impedance matching devices, a plurality of detection devices and to an encoding means such as a computer as described in the aforenoted copending U.S. application Ser. No. 406,680.

Figure 5:
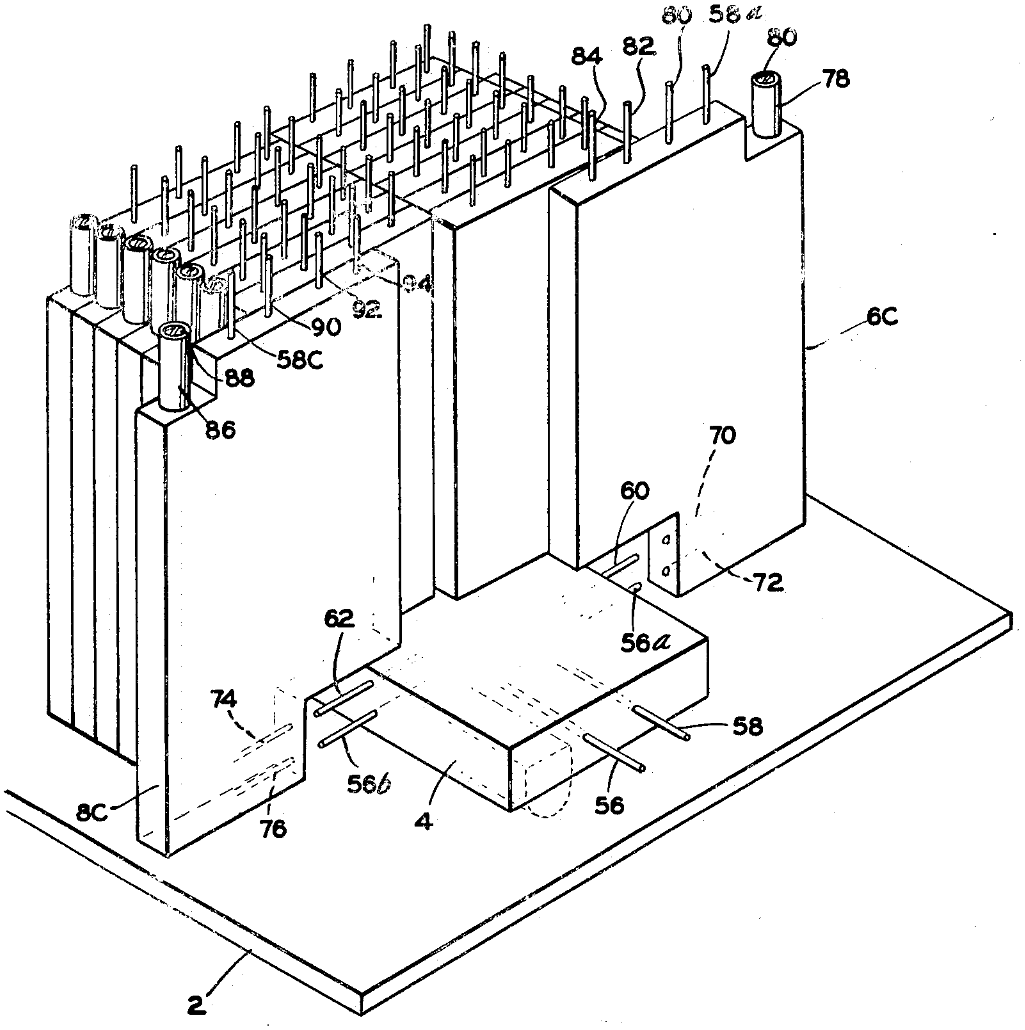
FIGURE 5 is a perspective view showing the assembly of the reader head base and the plurality of impedance matching circuits embodied in this novel means.

Referring now to FIGURE 5, a reader head base 4 is shown secured to a mounting frame 2 with a plurality of impedance matching means shown here for illustration as an impedance matching means 6*c* and an impedance matching means 8*c* coupled to the output conductors extending externally to the reader head base 4.

The circuitry for the impedance matching devices 6*c* and 8*c* is described in copending U.S. application Ser. No. 406,680. The electronic components described therein are interconnected to form a compact assembly with said assembly being encapsulated with an epoxy resin or other suitable insulating material. Each of the plurality of impedance matching devices such as the devices 6*c* and 8*c*, therefore, is in modular form, physically independent from the other circuitry relating to the present invention, but operably connected thereto.

The output from an output plate 6*b* of the capacitor 6 is coupled through the conductor 60 and the shield conductor 56*a* as shown in FIGURE 4, and this output is connected to the impedance matching device 6*c* by the conductor 60 and the shield conductor 56*a* connecting with a receptacle 70 and a receptacle 72 in the impedance matching device 6*c*. Similarly, the output from an output plate 8*b* of the capacitor 8 is coupled through a conductor 62 and a shield conductor 56*b* as shown in FIGURE 4, and this output is connected to an impedance matching device 8*c* by the conductor 62 and the shield conductor 56*b* connecting with a receptacle 74 and a receptacle 76 in the impedance matching device 8*c*.

In order to filter the alternating current input signal supplied to the capacitor 6, a capacitor 78 is provided integral to the impedance matching device 6*c*, and made adjustable, depending on the circuit characteristics, by adjusting screw 80. An alternating current input signal supplied to the capacitor 78 is coupled through the conductor 58*a*, and a conductor 80 is coupled to the positive terminal of a battery supply as described in coopending U.S. application Ser. No. 406,680. The output of impedance matching device 6*c* is coupled through a conductor 82 and grounded through a conductor 84.

In a similar manner, an alternating current input filtering means and input and output conductors are provided in impedance matching means 8*c*. A capacitor 86 made adjustable by a screw 88 is provided for the aforenoted filtering purposes. A conductor 58*c* couples the capacitor 86 to an alternating current input signal and a conductor 90 is coupled to a battery supply as described for the impedance matching device 6*c*. The output of impedance matching device 8*c* is coupled through a conductor 92 and grounded through a conductor 94.

A plurality of impedance matching devices, such as the means 6*c* and 8*c*, are provided, one for each of the capacitors such as the capacitors 6 and 8 contained in the reader head base 4. Each of the said impedance matching means are interconnected to the corresponding capacitor outputs in a manner corresponding to that described for the impedance matching means 6*c* and 8*c*.

Figure 6:
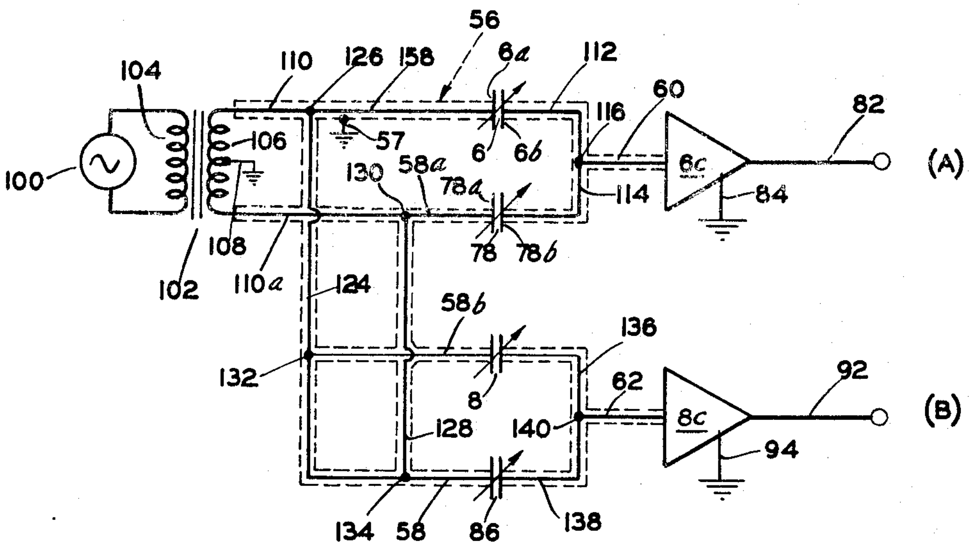
FIGURE 6 is a schematic diagram showing the electrical interconnections of the elements embodied in this novel means.

Referring now to FIGURE 6, an alternating current input supply is designated by numeral 100. Said input supply is coupled through a transformer 102 having a primary winding 104 inductively connected to a secondary winding 106 with a center tap ground 108. The purpose of coupling the input supply 100 with the transformer 102 as shown is to provide a phase angle difference between the output as measured at a conductor 110 and that as measured at a conductor 110*a*. In this manner, the output at the conductor 110 has a phase angle of zero degrees and that at the conductor 110*a* has a phase angle of 180 degrees.

In reference to circuit A of FIGURE 6, all input and output signals are shielded by a shield 56 connected to a grounded conductor 57. The output obtained from the secondary winding 106 of the transformer 102 through the shielded conductor 110 is coupled through a shielded conductor 58 to an input plate 6*a* of a capacitor 6, the purpose of the capacitor 6 being to read the voltage variation pattern which is evolved as shown in FIGURE 1 and in the description thereof. The output obtained from the secondary winding 106 of the transformer 102 through the shielded conductor 110*a* is coupled through a shielded conductor 58*a* to an input plate 78*a* of an adjustable capacitor 78, the purpose of the capacitor 78 being to filter the signal received from the input supply 100. The output from output plate 6*b* of the capacitor 6 is coupled through a shielded conductor 112 and is joined by the output from an output plate 78*b* of the capacitor 78 coupled through a shielded conductor 114 at a point 116. The combined output at the point 116 is coupled to an electronic control device 6*c* through a shielded conductor 60 for the purpose of impedance matching and the electronic control device 6*c* is connected to an output conductor 82 and to a ground conductor 84.

A plurality of such circuits, shown here as two in number for purposes of illustration, are interconnected as shown in FIGURE 6, each of the plurality of said circuits being coupled in parallel to the other of said circuits. Each circuit reecives input from the input supply 100 through the transformer 102.

In reference to circuit B of FIGURE 6, all input and output signals are shielded by the shield 56 connected to the grounded conductor 57. The input supply 100 is connected to the circuit B by a shielded conductor 124 joined by the shielded conductor 110 at a point 126 and a shielded conductor 128 joined by a shielded conductor 110*a* at a point 130. The input supply 100 is coupled from the point 126 to a capacitor 8 through the shielded conductor 124 joined at a point 132 by a shielded conductor 58*b* and from the point 130 to a capacitor 86 through the shielded conductor 128 joined at a point 134 by a shielded conductor 58*c*. The output from the capacitor 8 is coupled through a shielded conductor 136 and joins the output from the capacitor 86 coupled through a shielded conductor 138 at a point 140. The combined output at the point 140 is coupled through a conductor 62 to an impedance matching device 8*c* and the impedance matching device 8*c* is connected to an output conductor 92 and a grounded conductor 94.

Although the novel means described herein has been incorporated in an aircraft instrumentation display, it should be understood that it may be used in any system that employs a tape display means and requires that such means be interconnected to a feedback device.

The present invention has several distinct advantages which enhance its application in instrumentation display systems.

The novel device as shown in FIGURE 1 may be adapted with relative ease to existing tape display systems and without any impediment to the operation thereof. There is no intricate mechanism required being difficult to manufacture or assemble, and no additional tape driving means is required other than that conventionally used.

The molded construction of the reader head base 4 shown in FIGURE 3 and FIGURE 4, containing electrical connections embedded therein, is advantageous because protection against damage to these electrical connections is thus provided with a corresponding increase in the reliability of the device being the result.

In reference to FIGURE 5, the plurality of impedance matching devices designated by numerals 6c and 8c are each separately contained and encapsulated. The encapsulation will protect the circuitry within from being damaged, and moreover, the modular construction relied upon provides for easy replacement in case of an electrical or mechanical failure of one of said plurality of impedance matching devices.

Again, in reference to FIGURE 5, the externally adjustable capacitors 78 and 86 provide the important facility of being able to filter the input supply to the device without the costly and time consuming replacement of internal capacitors when circuit characteristics vary.

The ease of application, encapsulation of electrical connections, modular design and an external means for adjusting the pertinent circuitry provide an extensive area of utilization for the present invention.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An electrostatic sensing device comprising a mounting frame, a reader head base affixed to said mounting frame, said reader head base being of an electrical insulating material having a self-lubricating surface, said reader head base including a plurality of capacitors mounted therein, and input and output conductors connected to said plurality of capacitors, a guide block, said guide block including legs extending longitudinally on each side thereof, each of said legs having a groove therein and rollers being of an electrical insulating material having a self-lubricating surface journaled between said legs, said guide block adjustably mounted on said mounting frame with said grooves providing clearance between said guide block and said reader head base, a longtiudinally movable tape having a scale indicating a functional parameter on one side thereof and a plurality of coded capacitive channels on the other side of said tape arranged in a predetermined relation to said scale, said tape being arranged for longitudinal movement under the rollers of said guide block causing the capacitive channels on said tape to become adjacent to the capacitors in said reader head base producing a voltage output pattern, and said voltage output pattern connected through the output conductors of said plurality of capacitors to a corresponding plurality of electronic control means.

2. In a display system of a type including a longitudinally movable tape having a scale indicating a functional parameter, and a plurality of coded capacitive channels on said tape arranged in a predetermined relation to said indicating scale; the improvement comprising a reader head base of an insulating material and having a self-lubricating surface, a plurality of capacitors mounted in said reader head base, input and output conductors connected to the plurality of capacitors, said input and output conductors terminating externally of said reader head base, a plurality of electronic control means corresponding to said capacitors, a plurality of separate electrical insulating members, each of said insulating members containing one of said electronic control means, said insulating members being removably mounted on the output conductors of said reader head base, a filter capacitor mounted in each of said separate electrical insulating members for coupling an input supply of said plurality of capacitors to a corresponding input supply of said plurality of electronic control means, and the tape being arranged in slidable relation to the self-lubricating surface of the reader head base and in cooperative relationship to the plurality of capacitors so that longitudinal movement of the tape will cause the channels thereon to become adjacent to the capacitors in the reader head base causing a voltage output pattern to evolve, which is a function of the coded capacitive channels arranged in the predetermined relation to the scale on the tape.

3. The combination defined by claim 2 including in each of said separate electrical insulating members an externally operable means for adjusting the filter capacitor mounted thereon, and said electronic control means having output conductors to be operatively connected.

4. A converter for converting signals corresponding to a functional scale comprising a tape having a plurality of coded capacitive channels arranged in a predetermined relation to the functional scale, a reader head base comprising a plurality of capacitors corresponding to the channels, input and output conductors connected to said plurality of capacitors, means mounted over the reader head base to guide the tape relative to the base so that the channels on said tape cooperate with the capacitors in said reader head base to provide signals at each of said output conductors corresponding to said functional scale, said guiding means including a guide block mounted for lateral adjustment and having legs extending longitudinally on each side of said guide block with each of said legs having a centrally located groove to provide clearance between the guide block and the reader head base when said block is mounted over said base.

References Cited

UNITED STATES PATENTS

| | | | |
|---|---|---|---|
| 3,378,645 | 4/1968 | Heller | 179—100.1 |
| 1,580,112 | 4/1926 | Bone | 235—61.116 |
| 2,279,161 | 4/1942 | D'Humy | 178—112 |
| 2,686,008 | 8/1954 | Davidon | 235—92 |
| 2,850,240 | 9/1958 | Dickinson | 235—92 |
| 2,852,764 | 9/1958 | Frothingham | 235—154 |
| 2,873,440 | 2/1959 | Speller | 235—154 |
| 2,976,528 | 3/1961 | Greunke et al. | 235—154 |
| 2,996,948 | 8/1961 | Beachell | 179—100.2 |
| 3,229,045 | 1/1966 | Bakas et al. | 179—100.2 |

FOREIGN PATENTS

| | | |
|---|---|---|
| 819,349 | 9/1959 | Great Britain. |
| 830,679 | 3/1960 | Great Britain. |

MAYNARD R. WILBUR, Primary Examiner

T. J. SLOYAN, Assistant Examiner

U.S. Cl. X.R.

178—17; 340—173